United States Patent
Dietterich et al.

(10) Patent No.: US 10,558,628 B2
(45) Date of Patent: *Feb. 11, 2020

(54) REMOVAL OF GARBAGE DATA FROM A DATABASE

(71) Applicant: International Business Machines Corporation, Armonk, NY (US)

(72) Inventors: Daniel J. Dietterich, Cambridge, MA (US); Jeffrey M. Keller, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 269 days.

This patent is subject to a terminal disclaimer.

(21) Appl. No.: 15/803,962

(22) Filed: Nov. 6, 2017

(65) Prior Publication Data

US 2018/0060369 A1    Mar. 1, 2018

Related U.S. Application Data

(63) Continuation of application No. 14/501,774, filed on Sep. 30, 2014, now Pat. No. 10,255,304.

(51) Int. Cl.
*G06F 16/215* (2019.01)
*G06F 12/02* (2006.01)

(52) U.S. Cl.
CPC ........ *G06F 16/215* (2019.01); *G06F 12/0253* (2013.01); *G06F 12/0261* (2013.01); *G06F 12/0269* (2013.01); *G06F 12/0276* (2013.01); *G06F 2212/1044* (2013.01); *G06F 2212/702* (2013.01); *G06F 2212/7205* (2013.01)

(58) Field of Classification Search
CPC ............. G06F 12/0276; G06F 12/0269; G06F 12/0253; G06F 12/0261; G06F 2212/1044; G06F 2212/702; G06F 2212/7205; G06F 16/215; G06F 3/0608
USPC .................................................. 707/813, 814
See application file for complete search history.

(56) References Cited

U.S. PATENT DOCUMENTS 6,397,227 B1  5/2002  Klein et al.
6,973,452 B2  12/2005  Metzger et al.
(Continued)

OTHER PUBLICATIONS

List of IBM Patents or Patent Applications Treated As Related, Apr. 2019, 2 pages.

(Continued)

*Primary Examiner* — Dennis Truong
(74) *Attorney, Agent, or Firm* — Richard Wilhelm; Edell, Shapiro & Finnan, LLC

(57) ABSTRACT

Elements of a database object are removed. The database object is stored as a plurality of different object portions, where each object portion is associated with one or more versions of transaction identifiers stored separately from the database object. An oldest transaction identifier is determined for a transaction for which data portions of the database object remains visible. Each object portion is examined and object portions with a threshold amount of data to remove are determined based on a comparison of the transaction identifiers for those object portions and the oldest transaction identifier. Data from the database object are removed in response to a sufficient quantity of data is to be removed from object portions containing the threshold amount of data.

19 Claims, 7 Drawing Sheets

(56) References Cited

U.S. PATENT DOCUMENTS

| | | | |
|---|---|---|---|
| 7,149,762 B1* | 12/2006 | Garthwaite | G06F 12/0276 |
| | | | 707/758 |
| 7,305,386 B2 | 12/2007 | Hinshaw et al. | |
| 7,849,110 B2 | 12/2010 | Rossmann et al. | |
| 8,180,789 B1 | 5/2012 | Wasserman et al. | |
| 8,180,914 B2 | 5/2012 | Klein | |
| 8,301,671 B1 | 10/2012 | Greenwood et al. | |
| 8,412,689 B2 | 4/2013 | Reid et al. | |
| 8,521,949 B2 | 8/2013 | Xiong et al. | |
| 8,527,558 B2 | 9/2013 | King et al. | |
| 8,538,922 B2 | 9/2013 | Beier et al. | |
| 9,002,805 B1* | 4/2015 | Barber | G06F 16/215 |
| | | | 707/692 |
| 9,141,670 B2 | 9/2015 | Branscome | |
| 9,171,027 B2 | 10/2015 | Bhattacharjee | |
| 9,336,258 B2 | 5/2016 | Bhattacharjee et al. | |
| 9,519,591 B2 | 12/2016 | Lomet | |
| 9,519,687 B2 | 12/2016 | Dickie | |
| 9,547,659 B1 | 1/2017 | Barber et al. | |
| 9,659,039 B2 | 5/2017 | Ziauddin | |
| 9,672,241 B2 | 6/2017 | Dickie | |
| 2005/0257083 A1 | 11/2005 | Cousins | |
| 2006/0053087 A1 | 3/2006 | Pavlov | |
| 2006/0072400 A1* | 4/2006 | Anderson | G06F 3/0605 |
| | | | 369/47.1 |
| 2007/0005457 A1* | 1/2007 | Suvernev | G06F 9/466 |
| | | | 705/28 |
| 2007/0050382 A1 | 3/2007 | Bugir | |
| 2008/0005199 A1* | 1/2008 | Chen | H04L 67/1095 |
| 2008/0229025 A1* | 9/2008 | Plamondon | G06F 12/0862 |
| | | | 711/126 |
| 2010/0179963 A1 | 7/2010 | Conner | |
| 2010/0293135 A1 | 11/2010 | Candea | |
| 2011/0219020 A1 | 9/2011 | Oks et al. | |
| 2011/0219106 A1 | 9/2011 | Wright | |
| 2011/0228934 A1* | 9/2011 | Fukuda | H04L 63/068 |
| | | | 380/255 |
| 2011/0231447 A1* | 9/2011 | Starkey | G06F 16/27 |
| | | | 707/792 |
| 2012/0047126 A1 | 2/2012 | Branscome | |
| 2012/0084274 A1 | 4/2012 | Renkes et al. | |
| 2012/0109903 A1 | 5/2012 | Freedman et al. | |
| 2012/0127297 A1 | 5/2012 | Baxi | |
| 2012/0159098 A1* | 6/2012 | Cheung | G06F 12/0261 |
| | | | 711/162 |
| 2012/0221528 A1 | 8/2012 | Renkes et al. | |
| 2012/0246433 A1* | 9/2012 | Plancarte | G06F 12/0269 |
| | | | 711/166 |
| 2013/0054402 A1* | 2/2013 | Asherman | G06Q 10/101 |
| | | | 705/26.2 |
| 2013/0124470 A1 | 5/2013 | Kesselman et al. | |
| 2013/0179395 A1 | 7/2013 | Heman et al. | |
| 2013/0198139 A1 | 8/2013 | Skidanov | |
| 2013/0227237 A1 | 8/2013 | Tashiro | |
| 2013/0254242 A1 | 9/2013 | Kashiwagi et al. | |
| 2013/0339312 A1 | 12/2013 | Schreter | |
| 2014/0025651 A1 | 1/2014 | Schreter | |
| 2014/0040327 A1* | 2/2014 | Onodera | G06F 12/0261 |
| | | | 707/814 |
| 2014/0149647 A1 | 5/2014 | Guo | |
| 2014/0156719 A1* | 6/2014 | Leggette | H04L 67/1097 |
| | | | 709/201 |
| 2014/0195875 A1* | 7/2014 | Resch | G06F 11/1092 |
| | | | 714/763 |
| 2014/0233863 A1 | 8/2014 | Barrington | |
| 2014/0237004 A1 | 8/2014 | Schreter | |
| 2014/0245063 A1* | 8/2014 | Baptist | G06F 11/2094 |
| | | | 714/6.22 |
| 2014/0279961 A1* | 9/2014 | Schreter | G06F 3/0608 |
| | | | 707/693 |
| 2015/0006466 A1 | 1/2015 | Tonder | |
| 2015/0088844 A1 | 3/2015 | Stigsen | |
| 2015/0347492 A1 | 12/2015 | Dickie | |
| 2015/0379060 A1* | 12/2015 | Levandoski | G06F 16/2322 |
| | | | 707/607 |
| 2016/0004765 A1 | 1/2016 | Tyercha | |
| 2016/0070644 A1 | 3/2016 | D'Sa | |
| 2016/0092478 A1 | 3/2016 | Dietterich et al. | |
| 2016/0092495 A1 | 3/2016 | Dietterich et al. | |
| 2016/0092496 A1 | 3/2016 | Dietterich et al. | |
| 2016/0342630 A1 | 11/2016 | Dietterich et al. | |

OTHER PUBLICATIONS

Labrinidis et al., "A Performance Evaluation of Online Warehouse Update Algorithms." (1998), Center for Satellite and Hybrid Communication Networks, CSHCN T.R. 98-17 (ISR T.R. 98-63), 27 pages.

"A method for managing the deletion of an object in a User Interface", IP.com, IPCOM000224803D, Jan. 4, 2013, 3 pages.

Laurent et al., "Deleted Tuples Are Useful When Updating Through Universal Scheme Interfaces", IEEE 1992, 0-8186-2545-7/92, pp. 420-427.

Gorawski et al., "Query Processing Using Negative and Temporal Tuples in Stream Query Engines", CEE-SET 2009, LNCS 7054, pp. 70-83, 2012, IFIP International Federation for Information Processing 2012.

List of IBM Patents or Patent Applications Treated as Related, Nov. 2017, 2 pages.

* cited by examiner

REMOVAL OF GARBAGE DATA FROM A DATABASE

CROSS-REFERENCE TO RELATED APPLICATIONS

This application is a continuation of U.S. patent application Ser. No. 14/501,774, entitled "REMOVAL OF GARBAGE DATA FROM A DATABASE" and filed Sep. 30, 2014, the disclosure of which is incorporated herein by reference in its entirety.

BACKGROUND

Present invention embodiments relate to database maintenance, and more specifically, to removing garbage data (e.g., data that is no longer referenced or obsolete) from a database that employs separate transaction identifier storage.

In a relational database, tables of data are stored in which data from one table may have some relationship with the data stored in another table. The relationships between the data in the various tables allow the processing of queries (e.g., database searches) in an orderly fashion.

When plural users or computer processes have access to the same database simultaneously (i.e., concurrently), issues may arise with respect to changing the existing data in the database. For example, if a database record is in the process of being created or modified, many database systems that do not provide concurrency control will "lock" that record for the duration of the update. Thus, in order to avoid the "locking" of individual or groups of records, multiple copies of the same record are permitted using multi-version concurrency control (MVCC) whereby multiple transactional changes to a database record are reconciled at some later point in time. However, when a database employs MVCC, multiple users or processes may change a record and multiple copies of the same record (with their corresponding changes) are stored until all changes are reconciled and committed.

Thus, in order to reconcile multiple changes to a given record, transaction identifiers (TIDs) are maintained for each copy or version of a record with actual or attempted record changes. A version of a record is marked for removal, either due to deletion or update of the record, by modifying the TID associated with that record. A tuple marked for deletion is not necessarily a garbage tuple that can be permanently removed since that tuple may be visible to other executing transactions, and should therefore, be retained. Existing approaches for performing database garbage collection or removal of garbage data include waiting until an entire page or set of data become garbage for removal, or by incrementally deleting garbage tuples as they are designated. In many cases, it is the responsibility of the system operator or user to invoke garbage collection to avoid conflicting with real-time production operations. These approaches have drawbacks in that garbage may be persistent for a period of time or otherwise consume current processing time since that data may still be processed or filtered. In addition, removing garbage by scanning through all data is both time consuming and competes with other operations. Furthermore, the database system does not "know" the quantity of garbage tuples present in the data store at any given time in order to trigger a given garbage collection event (e.g., the system cannot automatically garbage collect or prompt the user to initiate such garbage collection).

SUMMARY

According to one embodiment of the present invention, data from a database object are removed. The database object is stored as a plurality of different object portions, where each object portion is associated with one or more versions of transaction identifiers stored separately from the database object. An oldest transaction identifier is determined for a transaction for which data portions of the database object remains visible. Each object portion is examined and object portions with a threshold amount of data to remove are determined based on a comparison of the transaction identifiers for those object portions and the oldest transaction identifier. Data from the database object are removed in response to a sufficient quantity of object portions containing the threshold amount of data to be removed.

Embodiments of the present invention include a method, a system and computer program product for removing garbage data from a database with a separate transaction identifier storage scheme in substantially the same manner described above.

BRIEF DESCRIPTION OF THE SEVERAL VIEWS OF THE DRAWINGS

Generally, like reference numerals in the various figures are utilized to designate like components.

DETAILED DESCRIPTION

Figure 1:
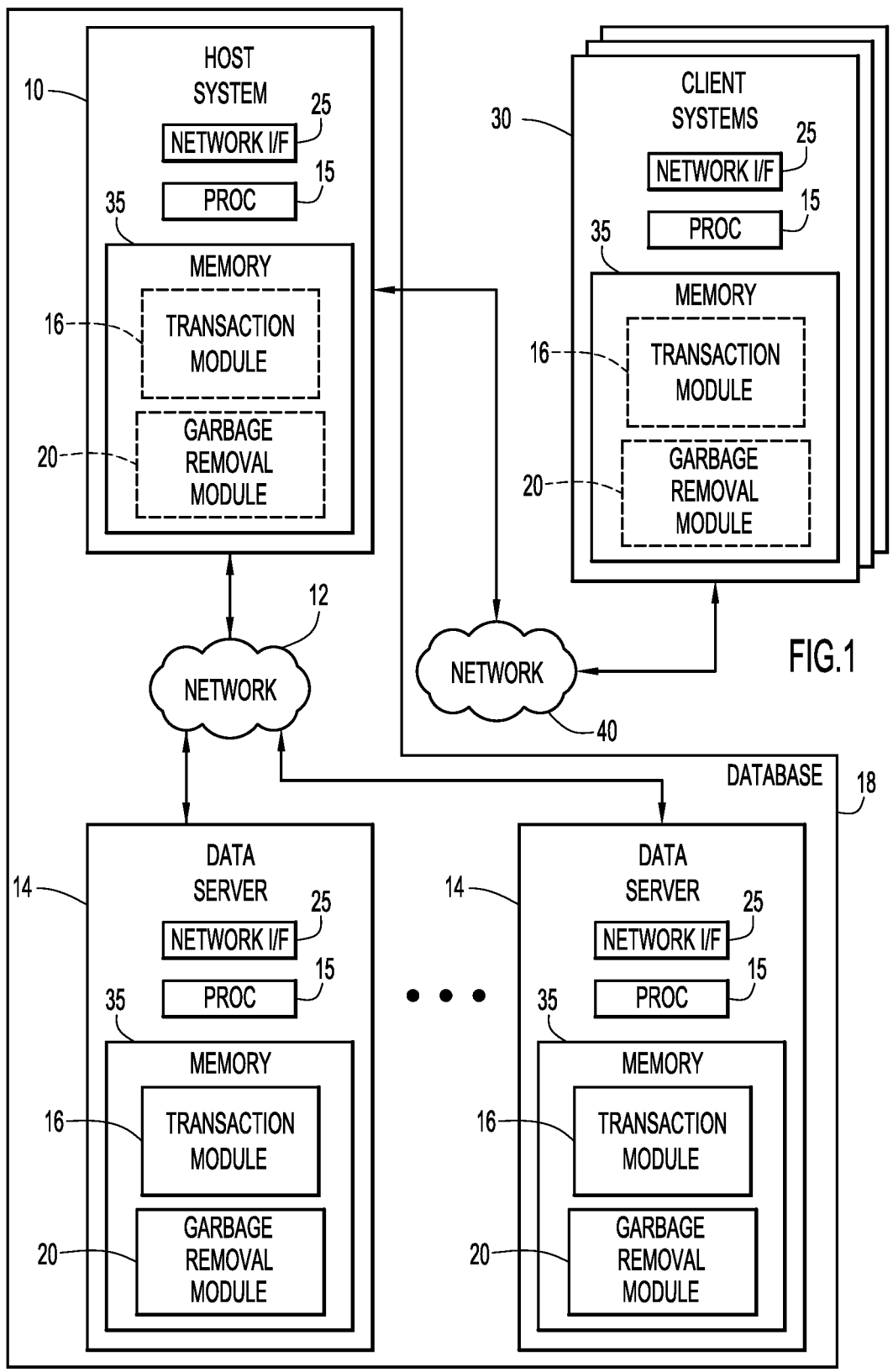
FIG. 1 is a diagrammatic illustration of an example computing environment for use with an embodiment of the present invention.

Present invention embodiments improve optimization of search engine (e.g., a database search engine) operation by determining when to permanently remove garbage data (e.g., data that is no longer referenced or obsolete) when the amount of garbage data reaches a threshold, e.g., using a threshold or threshold test statistic. For example, a threshold may include a percentage of deleted data (tuples) that are no longer visible to any transaction being processed by the database system. Other thresholds may be derived from statistics based parameters, for example, associated with the Gaussian or Chi-square distributions. When the amount of garbage data in the system reaches the threshold, a database garbage collection procedure may be initiated to remove the garbage data.

These techniques have several advantages among others. For example, since there are costs associated with both maintaining deleted data and the resources used to perform garbage collection, database garbage collection operations can be tuned to balance these costs. For example, when deleted tuples have not been permanently removed, they take up storage space and consume storage input/output (I/O) resources since data to be scanned are read from storage and will contain the deleted data. Thus, there is a benefit to permanently deleting or removing data marked for deletion when the deleted data may be designated as garbage data (e.g., no longer referenced (or visible to any transaction)). Next, the system "knows" with a greater degree of certainty, the amount of data that has been deleted and the amount of the deleted data that can be considered garbage data, and therefore, permanently removed. Lastly, since the system is aware of the quantity of garbage data, the system can make an informed decision with respect to the cost of storage and I/O versus the cost performing database garbage collection. The database garbage collection costs may include reading portions of data, removing the garbage data and rewriting the "clean" data back to permanent storage. Database cleanup may also include consolidating plural portions of a database object (e.g., when an object portion contains very few remaining records or tuples).

The garbage collection techniques may be facilitated by storing certain database metadata with regard to transaction identifiers (TIDs) separately from the associated tuple. The TIDs may be based on an integer counter that increments monotonically (e.g., by one) for each new transaction or database scan, thereby creating a unique ID for each transaction. Briefly, the TIDs may be assigned as creator TIDs (ctids) that are unique for a given record or tuple that is newly created by the transaction (i.e., each tuple or record has one unique ctid). TIDs may also be assigned as deleter TIDs (dtids) that are unique for a given record or tuple that is to be deleted (or changed) by the transaction. A committed record has, at most, one dtid when that record has been successfully deleted. In one example, when a record is modified, the original record may be deleted and replaced by its modified counterpart, where the modified counterpart may be further modified by a subsequent or additional in-queue transaction. The ctids and dtids are stored in a column store with one or more TIDs (creator or deleter) being associated with a given tuple. This technique allows several versions of a tuple to exist, where different TIDs may be associated with the versions of a given tuple.

Plural tuples may be grouped together to form an object portion such as a database zone. The zone may comprise sections or segments of a given table, or may be formed of data partitions of convenient size for data processing. Zone indices may be maintained along with or that include zone maps that may, in turn, include other indices or descriptors such that a descriptor entry describes the storage for a set of tuples (i.e., the zone index provides a map structure that includes indices, descriptor or other data pointers). A zone index may include one descriptor entry with one version of the dtid column for a set of tuples, and may include another descriptor entry that describes the storage for the same set of tuples, yet with a different version of the dtid column. The zone indices are implemented such that a given transaction can determine which of the versions of the dtid column it should use when processing the set of tuples. Zone indices are further described below.

For example, metadata may be maintained about each region of table storage. The metadata may contain value ranges or range maps that indicate minimum (min) and maximum (max) values for data of a given column (col) (e.g., the min/max values among individual column values stored in a database cell). A zone map may contain multiple range maps.

For example, if a storage region is known to contain records with column values between 100 and 200 (i.e., col 1 {100, 200}), then a query restricted to records with column values greater than 500 will not read that storage region. In contrast, an index provides a pointer to a record (e.g., column value) with a specific value. When the column values associated with a given index are sorted, then an index may provide a starting or stopping point for a search. When range maps are employed, record addition and deletion may not require a change in the range map as long as those record's column values fall within the range map. The zone map may include both indices and range maps, as described hereinafter.

An example environment for use with present invention embodiments is illustrated in FIG. 1. Specifically, the environment includes one or more server or host systems 10, and one or more data servers 14. Host systems 10 and data servers 14 may be remote from each other and communicate over a network 12. The network may be implemented by any number of any suitable communications media (e.g., wide area network (WAN), local area network (LAN), Internet, intranet, etc.). Alternatively, host systems 10 and data servers 14 may be local to each other, and communicate via any appropriate local communication medium (e.g., local area network (LAN), data center network, hardwire, wireless link, intranet, etc.). One or more clients or end user systems 30 may be coupled to host systems 10 via a network 40, or by a data center network or data center edge switch.

Host systems 10, data servers 14, and clients systems 30 may be implemented by any conventional or other computer systems preferably equipped with a display or monitor (not shown), a base (e.g., including at least one processor 15, one or more memories 35 and/or internal or external network interfaces or communications devices 25 (e.g., modem, network cards, etc.), optional input devices (e.g., a keyboard, mouse or other input device), and any commercially available and custom software (e.g., server/communications software, transaction module, garbage removal module, browser/interface software, etc.). Data servers 14 may comprise compute and storage nodes or database engine blades (e.g., in a datacenter or server farm).

Data servers 14 may receive user/DBMS query or transaction information related to desired database information (e.g., data, documents, etc.) from host systems 10. In another example, the transaction information and queries may be received by the data servers, either directly or indirectly (e.g., from a client system). The host systems 10 may include a transaction module 16 to generate zone indices and/or zone maps for a column store (e.g., data range maps, ctids and dtids), and to process transactions configured to add, modify or delete tuples using the zone indices and/or maps. In general, ctids are unique identifiers assigned to a tuple upon tuple creation, while dtids are unique identifiers assigned to a tuple upon tuple deletion, modification or replacement. The host systems 10 may also include a garbage removal module 20 to perform garbage collection using the TIDs (e.g., as stored in a zone map).

One or more components of the host systems 10, network 12 and data servers 14 may comprise a database management system (DBMS) or database 18. The database system 18 may use any conventional or other database, or storage unit. Other DBMS components may be local to or remote from host systems 10 and data servers 14, and may communicate via any appropriate communication medium such as network 12 and/or network 40 (e.g., local area network (LAN), wide area network (WAN), Internet, hardwire, wireless link, intranet, etc.). Any clients, hosts, or data servers may present a graphical user interface (e.g., GUI, etc.) or other interface (e.g., command line prompts, menu screens, etc.) to solicit information from users pertaining to zone indices and maps, and transactions, and to provide results (e.g., transaction results, storage statistics, garbage collection statistics, etc.). Further, these systems may provide reports to the user via the display or a printer, or may send the results or reports to another device/system for presenting to the user.

Alternatively, one or more hosts 10 or clients 30 may generate zone indices and/or maps and perform query processing when operating as a stand-alone unit (i.e., without using data servers 14). In a stand-alone mode of operation, the host/client stores or has access to the data (e.g., zone indices and/or maps, databases, etc.), and includes transaction module 16 to generate zone indices and/or maps and garbage removal module 20 to process transactions. The graphical user interface (e.g., GUI, etc.) or other interface (e.g., command line prompts, menu screens, etc.) solicits information from a corresponding user pertaining to transactions, and may provide reports (e.g., transaction results, storage statistics, garbage collection statistics, etc.).

Transaction module 16 and garbage removal module 20 may include one or more modules or units to perform the various functions of present invention embodiments described below. The various modules (e.g., transaction module, garbage removal module, etc.) may be implemented by any combination of any quantity of software and/or hardware modules or units, and may reside within memory 35 of the host and/or data servers for execution by processor 15. It should be understood, that the computing environment depicted in FIG. 1 provides example platforms (e.g., host systems 10, backend or data servers 14) for illustrating the techniques described herein. In this regard, data and zone indices and/or maps on one data server 14 may have no relationship with data, and indices and/or zone maps on another data server 14.

Figure 2:
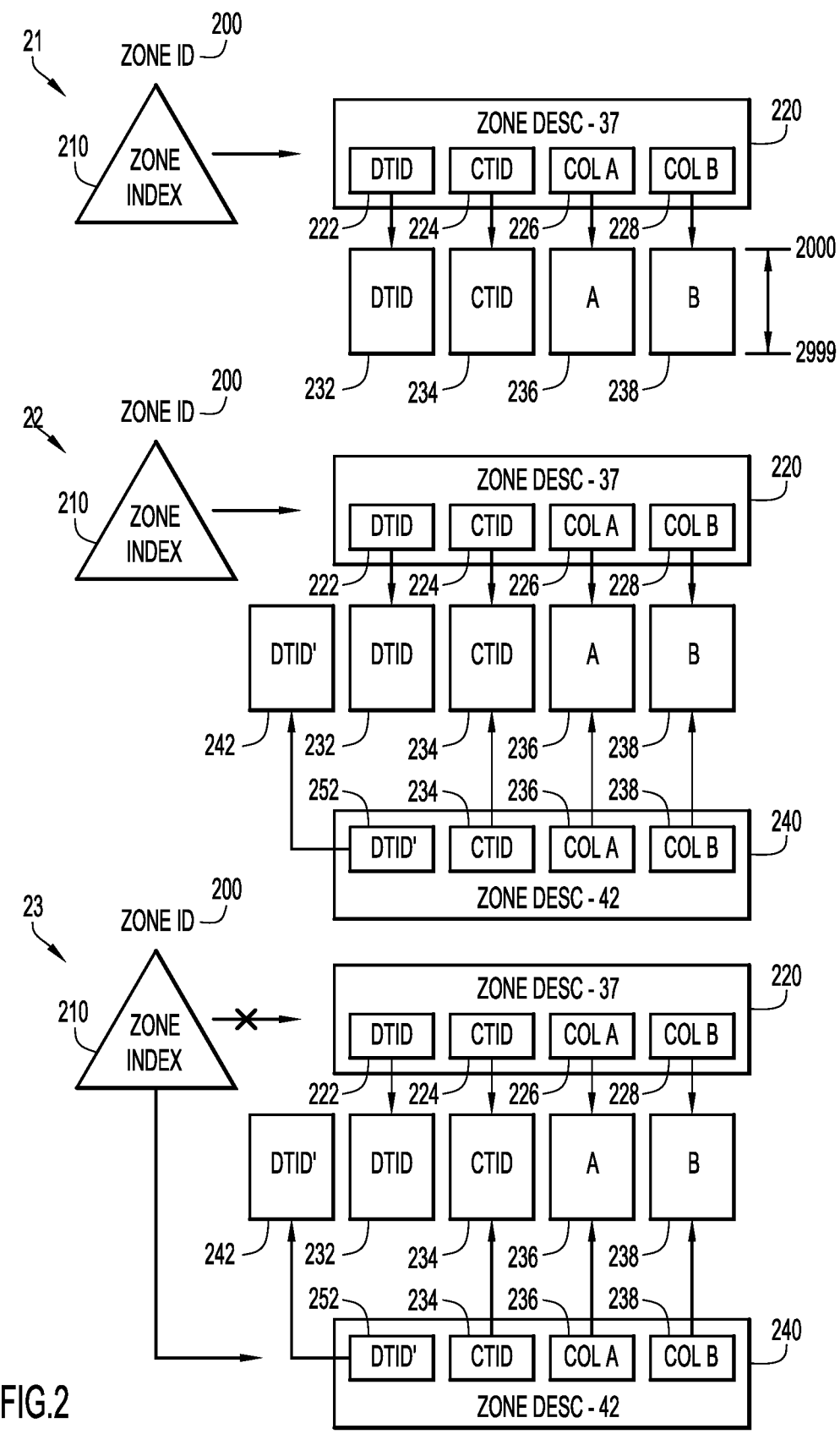
FIG. 2 is a graphical illustration of a zone index data structure and data in several stages of transition when managing tuples in a database according to an embodiment of the present invention.

To facilitate the understanding of the inventive concepts presented herein, a series of graphical illustrations, each representing an example data structure for zone indices and their associated data, are described with respect to FIG. 2. In general, present invention embodiments relate to zone indices and zone maps, commit transaction processing, and the operation of database scanners for executing database transactions. Associated with the zone index is a set of data structures that may include: a read-write lock (e.g., in a pthread implementation) for controlling concurrent access to those data structures such as descriptors, a monotonically increasing scan version number, a list of the version numbers of active scanners, and a list, ordered by scan version number, of entries (e.g., zones) in the index that are waiting to be processed (e.g., deleted). In general, the techniques described herein are made with respect to an iteration of a database scan or transaction.

As described above, the table data (database object) may be divided into zones (object portions) each comprising some number of tuples. Each zone has a unique identifier, i.e., a zone identifier (ID). The zone ID is used to map, via the zone index, to a zone descriptor for that zone. In this example, three zone data structures 21, 22 and 23 are depicted in accordance with the passage of time, e.g., during processing of a transaction or scan.

A first data structure 21 is a starting point and comprises a given zone ID 200. The zone ID 200 is, in turn, associated with a zone index 210, where the zone index 210 has a pointer to a zone descriptor 220 (e.g., with an example value of 37). Zone descriptor 220, in turn, comprises data pointers 222, 224, 226 and 228 (e.g., metadata associated with the zone) with each data pointer pointing to columns of data 232, 234, 236 and 238 within the zone. Accordingly, the zone map includes the zone index and the zone descriptor, and the data structure 21 further includes the underlying or associated data. In this example, zone descriptor 220 has a dtid pointer 222, a ctid pointer 224, and pointers 226, 228 to data stored for columns A and B, respectively. The data for the dtid, the ctid, column A and column B may be stored separately from zone descriptor 220. In this example, data structure 21 shows a zone map and data for one zone of a table containing tuples with identifiers ranging from 2000 through 2999.

At some point in time, a delete request is received or generated by the DBMS or record management system. The request may include a "delete tuple" request that includes a tuple identifier value, e.g., "2120", in order to delete tuple 2120 within the tuple identifier range of 2000 through 2999. In a database that employs MVCC or other versioning scheme, multiple copies of the same or similar record (with their corresponding changes) are stored until all changes are reconciled and committed. Accordingly, multiple unreconciled copies (versions) of a tuple may exist, each with a dtid that corresponds to a time of the change (e.g., either by a timestamp or driven by the sequential incrementing of TIDs that inherently provide a time sequence).

Referring to data structure 22, in order to process the deletion of tuple 2120, a copy of the dtid column 232 is copied (or instantiated) as denoted as dtid' (prime) 242. The dtid' column is modified to indicate that tuple 2120 is to be deleted. For example, the current TID is inserted into the dtid' column for tuple 2120 (e.g., to replace a NULL value or other deleter TID). In addition, tuple 2120 may be explicitly marked for deletion in the column store metadata. Simultaneously, or nearly so, with the creation of dtid' 242, a new zone descriptor 240 is created with an example value 42. The new zone descriptor 240 substitutes the pointer 222 to the dtid column store with a pointer 252 to the dtid' column store as shown in the figure.

Upon a successful "commit," some or all or the pending actions (e.g., tuple additions, modifications or deletions) for the zone are finalized. Referring to data structure 23, after a successful commit, the zone descriptor 220 and the dtid column store 232 are discarded or otherwise marked for deletion, the zone index is updated to point to zone descriptor 240, and the new zone descriptor 240 refers to dtid' 242 via pointer 252. In this regard, the metadata such as zone indices and zone descriptors may be stored in volatile memory while dtid columns, ctid columns, and column stores A and B may be stored in persistent storage. In one example, as dtid' 242 is created that garbage collection statistic may be updated or modified, and may be further updated and/or modified upon a successful commit. In addition, certain information may be held in a log file to facilitate database reconstruction should a system failure or rollback occur. In this manner, the zone index can use the various versions of the TIDs in the dtid columns to control the "visibility" of a given tuple to a given transaction. The concept of tuple visibility is described with respect to the remaining figures.

Figure 3:
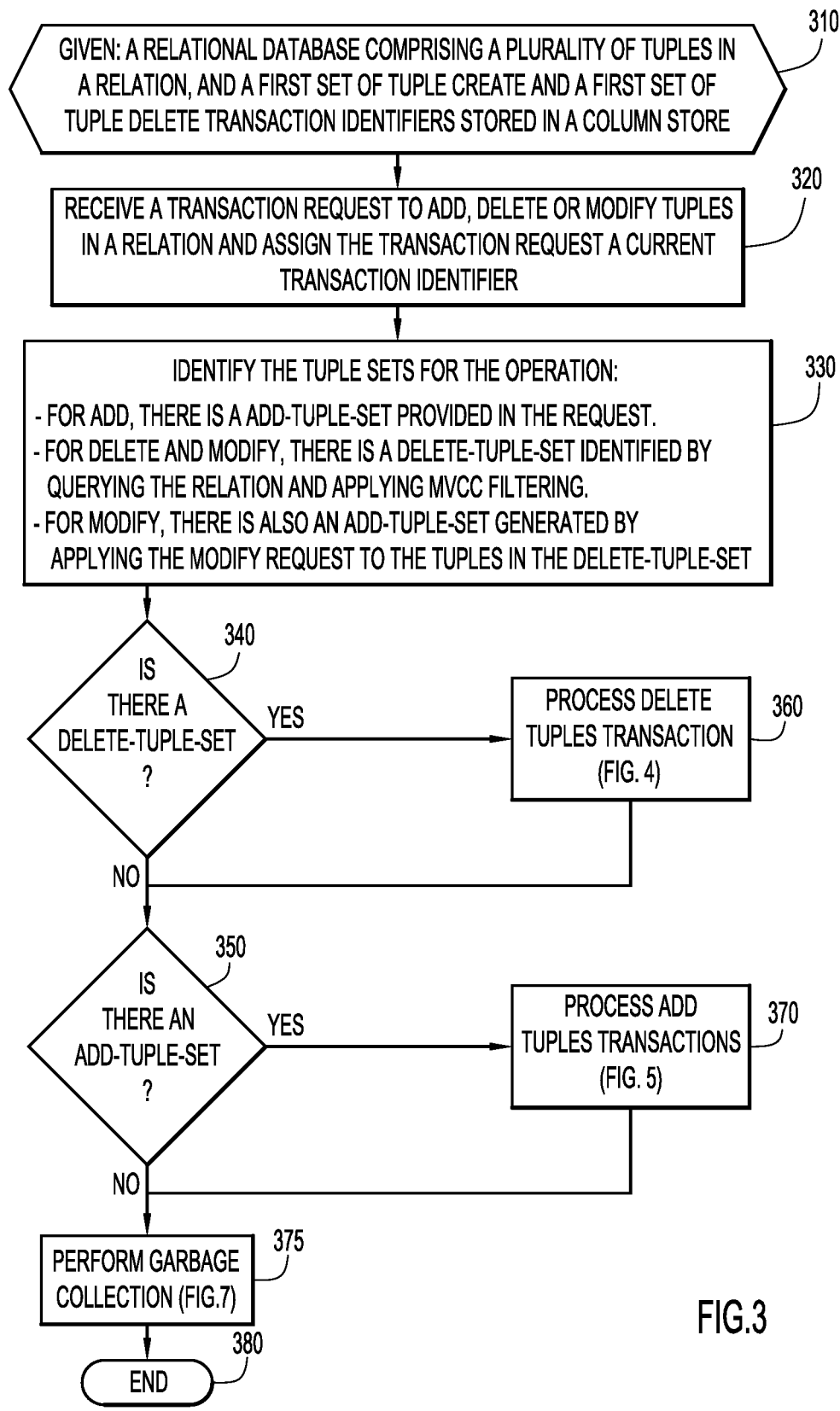
FIG. 3 is a procedural flow chart illustrating a manner in which tuples are added, modified or deleted in a database according to an embodiment of the present invention.

A manner in which transaction module 16 and garbage removal module 20 (e.g., via a host system 10, client systems 30 and/or data server 14) process data within a database object according to an embodiment of the present invention is illustrated in FIG. 3. Initially, given at step 310 are a relational database that comprises a plurality of tuples in a relation, where a first set of tuple create TIDs and a first set of tuple delete TIDs are stored in a column store. Generally, the techniques described herein are made with respect to databases that employ MVCC. However, any database that allows tuple access, without strict record locking mechanisms may employ the techniques described herein. Furthermore, those skilled in the art would realize that these techniques may be implemented in a row store or hybrid store (e.g., a combination or row and column stores) by separately storing certain deleter information in order to achieve the compression and I/O efficiencies, etc., described above.

A transaction request is received that includes instructions to add, delete or modify tuples in a relation (or zone partition or segment) and the transaction request is assigned a current TID at step 320. The tuple sets for the operation (i.e., those tuples impacted by the operation) are identified at step 330. The transactions, as used herein, may be executed by functions, function calls, procedures, remote procedure calls (RPCs), and the like (e.g., by transaction module 16 and garbage removal module 20). For add transactions, the set of tuples to be added, or the representations thereof, may be referred to as an add-tuple-set. The add tuple transaction may include, e.g., actual tuple data, pointers to the data, or tuple identifiers. For delete transactions, there is a delete-tuple-set provided in the request that identifies tuples to be deleted. In this regard, for a delete transaction, tuples may be marked for deletion. However, for simplicity, with a modify transaction, the tuples to be modified may be both modified and stored anew, while the original tuples are deleted. In that sense, tuple modify transactions comprise both an add-tuple-set to add modified tuples as a new set of tuples and a delete-tuple-set to discard the version of tuples prior to said modification.

Since a delete or modify transaction implies the removal of data, the delete-tuple-set may be identified by querying the relation and applying MVCC filtering (i.e., determining if a tuple is visible to the transaction). It is determined whether a delete-tuple-set is part of the transaction request (e.g., for delete or modify transaction requests) at step 340. When the processing of a transaction request indicates that a delete-tuple-set is present at step 340, the process proceeds to step 360 where the process description continues with respect to FIG. 4. Otherwise, the process determines whether an add-tuple-set is present at step 350. When a transaction includes an add-tuple-set, the process proceeds to step 370 where the process description continues with respect to FIG. 5. Optionally, at this point or at some other convenient processing point (e.g., a batch scheduled process), garbage collection may be performed at step 375, which is described in connection with FIG. 7. When transaction processing for a given transaction (or set of transactions) is complete the process ends at step 380.

In the examples presented herein with respect to the various flowcharts, it will be appreciated that DBMS operations are complex, nested or may otherwise comprise entry or exit points for the various enumerated flowchart steps or other process steps that are not specifically described or enumerated herein. Any given step or processing point may include processing options for commit processing that may be initiated at a convenient database processing point, e.g., a commit may be initiated after any given transaction has been processed. Examples of commit processing are described in connection with FIG. 6.

Figure 4:
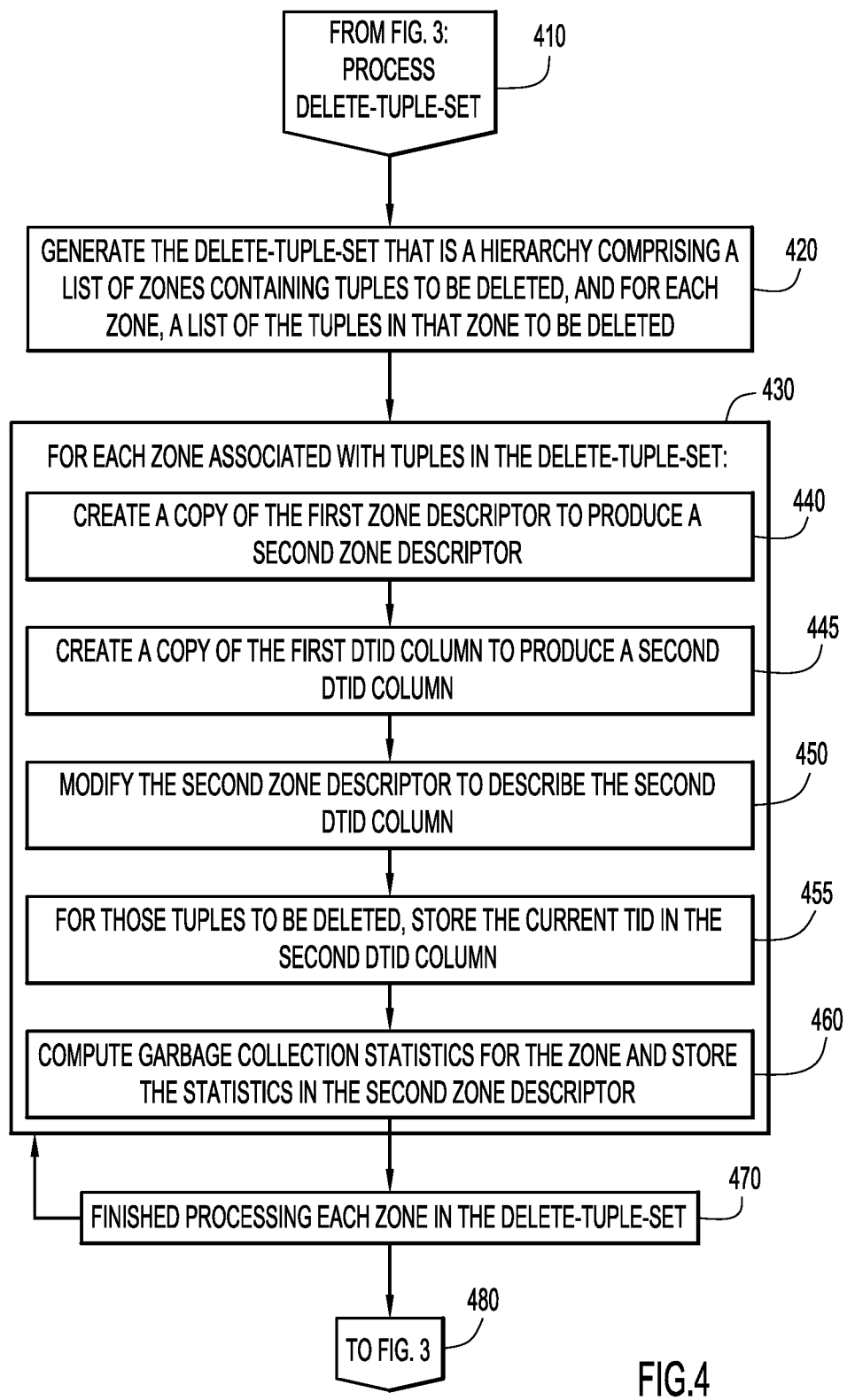
FIG. 4 is a procedural flow chart illustrating a manner in which tuples are deleted in a database according to an embodiment of the present invention.

Referring to FIG. 4, the manner in which transaction module 16 and/or garbage removal module 20 remove tuples within a database object (e.g., a table or relation) continues from FIG. 3 to FIG. 4 as indicated by off-page connector at reference numeral 410. In this example, the delete-tuple-set is generated and comprises a hierarchy that may include a list of zones containing tuples to be deleted, and for each zone, a list of the tuples in that zone to be deleted at step 420. For each zone associated with tuples in the delete-tuple-set, a series of steps are described with respect to each zone to be processed beginning at step 430. The series of steps at 430 may be iteratively processed for each zone, e.g., by way of a processing queue. With respect to each zone to be processed at step 430, first and second zone descriptors, and first and second dtids are referred to with respect to FIG. 4 in order to indicate a temporal relationship between the descriptors and dtids on a per zone processing basis.

A copy of a first zone descriptor is created to produce a second zone descriptor at step 440. Further, a copy of the first zone's dtid column is created to produce a second dtid column at step 445. The copy of the second zone descriptor is modified to describe the second dtid column at step 450. For those tuples to be deleted in the zone, store the current TID in the second dtid column at step 455. Garbage collection statistics are computed (or generated) for the zone during zone processing and the garbage collection statistics are stored in or along with the second zone descriptor at step 460. Once the garbage collection statistics (e.g., additional metadata) are amassed for the given zone, the process at step 430 iterates until processing for each zone of the delete-tuple-set is complete at step 470. The process returns, at step 480, to FIG. 3 at step 350.

Figure 5:
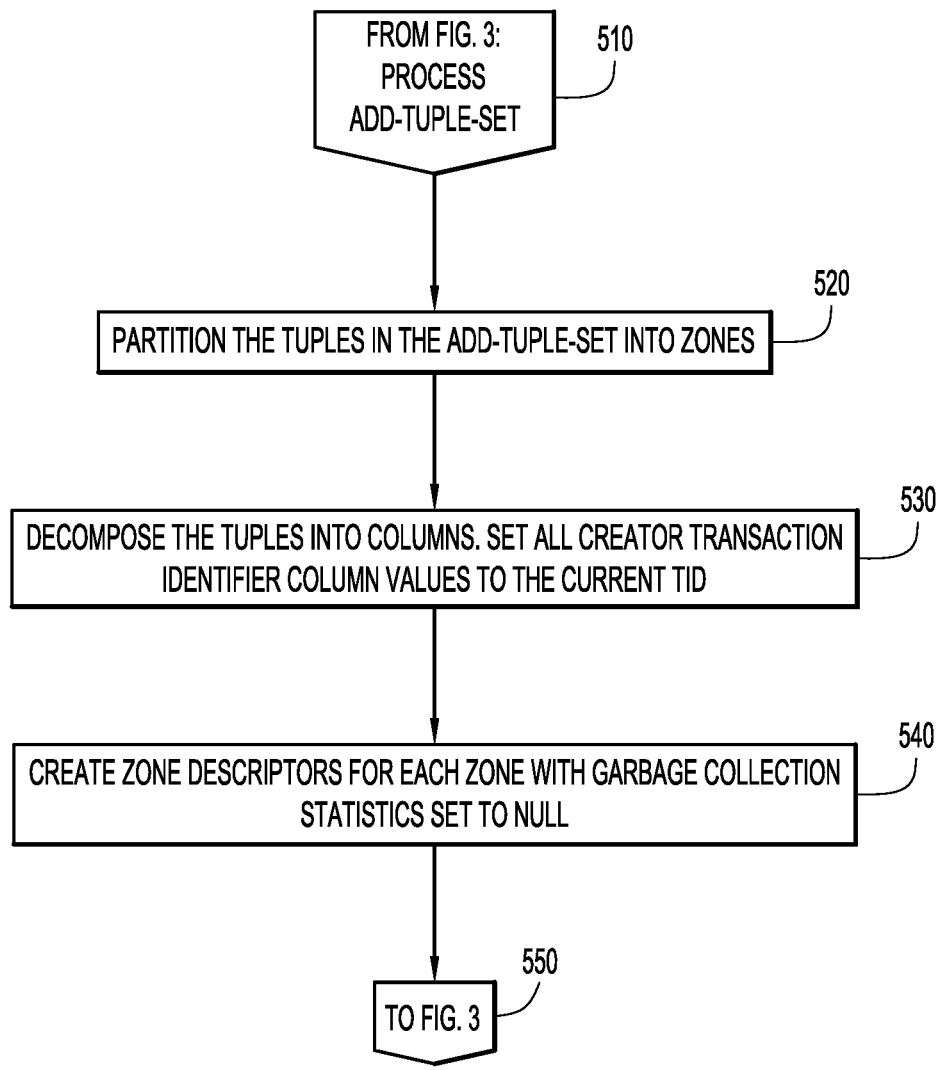
FIG. 5 is a procedural flow chart illustrating a manner in which tuples are added in a database according to an embodiment of the present invention.

Referring to FIG. 5, the manner in which transaction module 16 and/or garbage removal module 20 processes or accesses data within a database object continues from FIG. 3 (step 370) to FIG. 5 as indicated by off-page connector at reference numeral 510. In this example, the add-tuple-set comprises a list of tuples or their identifiers. The tuples identified in the add-tuple-set are partitioned among their respective zones at step 520. In other words, the tuples in the add-tuple-set may span plural zones whereby the zoned tuple partitions are iteratively processed on a zone-by-zone basis that is similar to the processing of tuples in a delete-tuple-set.

Each set of tuples assigned to a particular zone at step 520 are decomposed into columns for their respective zones at step 530. The decomposing step 530 recognizes that for column stores of the present invention embodiments, column data has a correlation with tuple (row) data. As part of decomposing step 530, for all tuples added, their corresponding ctid values are assigned or set to the current TID value since they are newly being created. Zone descriptors are created for each zone with tuples added thereto, and their corresponding garbage collection statistics for the new tuples may be set to a non-descript value or NULL at step 540 (i.e., no database garbage exists for newly added tuples). When transaction processing for an add-tuple-set transaction (or set of transactions) is complete, the process returns, at step 550, to FIG. 3, step 375 for garbage collection.

In one example, once a portion of tuple processing with respect to add-tuple-set and/or delete-tuple-set transactions are complete, a commit procedure may be executed and is described in connection with FIG. 6. As described above, it should be noted that commit processing may be initiated at any particular processing point. The commit procedure ensures that tuples processed by multiple or concurrently run transactions are returned to a stable state (e.g., from a volatile state resulting from multiple transactions applied to a given tuple).

Figure 6:
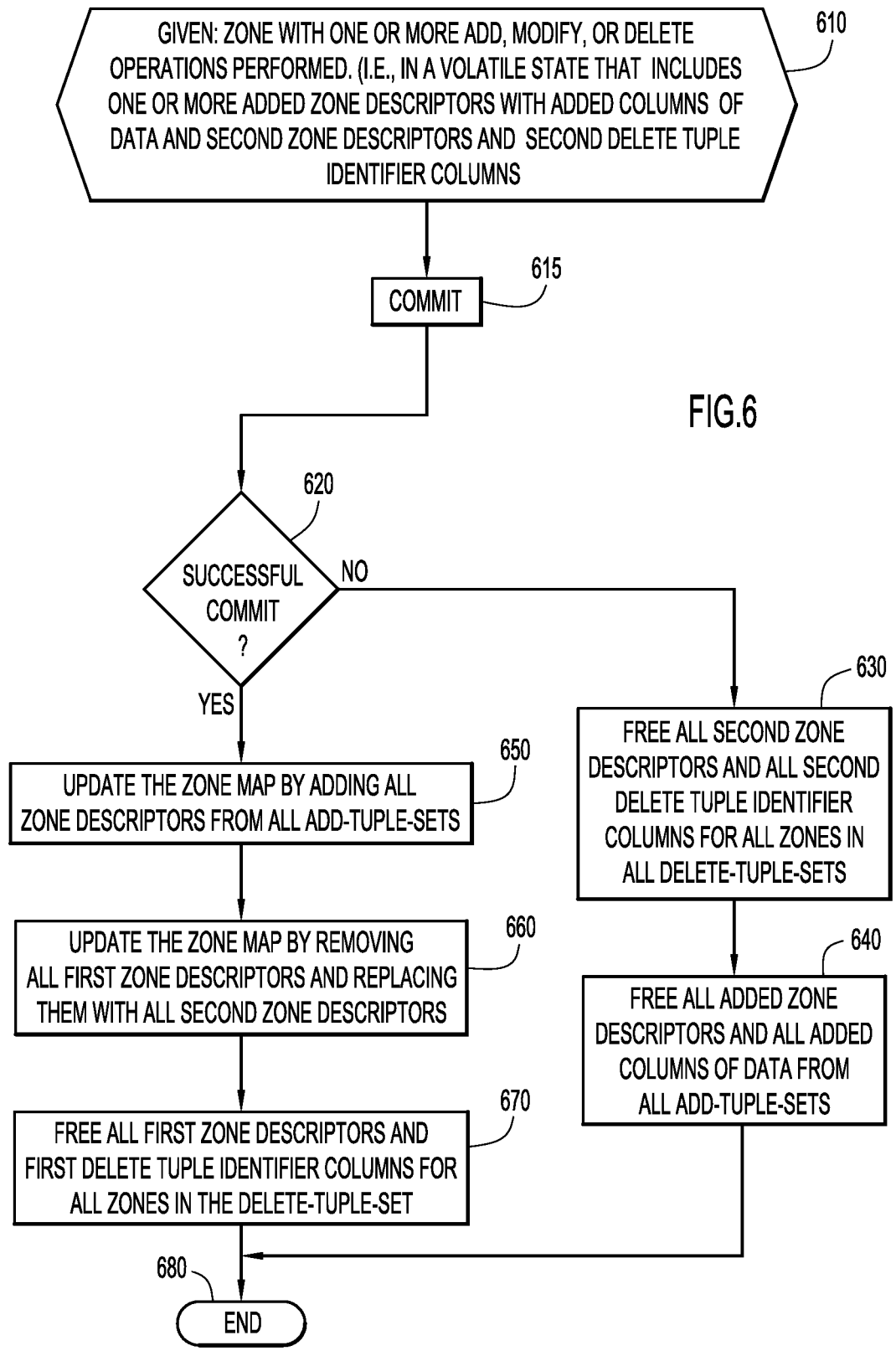
FIG. 6 is a procedural flow chart illustrating a manner in which added, modified or deleted tuples in a database are processed during a database commit according to an embodiment of the present invention.

The manner in which transaction module 16 and garbage removal module 20 commit tuples (data) from one or more transactions within a database object is described with respect to FIG. 6. Initially, given at step 610 is a zone in a volatile state with one or more add, modify or delete operations having been performed. As previously described, the tuples within a zone may be in a volatile state (i.e., with pending to uncommitted transactions) and include added zone descriptors with added columns of data, added zone descriptors and added delete tuple identifier columns (i.e., dtid columns).

A database commit function is executed at step 615. The commit function allows for the reconciliation of plural transaction with respect to the zone (i.e., the transactions are made permanent with respect to a given commit transaction). Commit transaction processing may operate as follows. The zone index is exclusively locked, thereby preventing a scanner from creating a new list of zones. Newly created database entries (e.g., added tuples) may be inserted, e.g., by reference, into the zone index, and for deleted database entries (e.g., deleted tuples), those records may be marked for deletion, where the commit process may not remove the entries from the index. One reason the commit process may not remove the entries is that an active table scan (e.g., from another transaction) may have started before the current commit, and may still need to reference those entries. The committing transaction saves its list of entries to delete and the current scan version number in the zone index structure.

It is determined whether the commit was successful at step 620. Under certain circumstances the database cannot perform a successful commit. Typically, the transaction or plural transactions may contain logical errors or user errors that do not result in a record that can be made permanent by way of a current commit operation. Accordingly, the respective transactions cannot be completed and are placed in failed state (e.g., an SQL abort state). When the commit fails, those affected transactions are rolled back to their pre-transaction state and an error or other notification may be generated.

Accordingly, when the commit fails, as determined at step 620, all secondary zone descriptors and all secondary delete tuple identifier columns (dtids') for all zones in all delete-tuple-sets are freed at step 630. All added zone descriptors and all added columns of data from all add-tuple-sets are freed at step 640. In general, when the zone descriptors are discarded or freed, it means the storage space held by the data is freed. In the case of a delete transaction, there are two zone descriptors pointing to the same storage spaces for all but the deleter TID column(s). It is not desirable to free that particular storage (since there are multiple references (pointers)) until those references can be affirmatively resolved. One example manner handling this issue is with reference counting. A physical page of storage can be used by one or more columns in one or more zone descriptors (i.e., a page of data may span multiple zones). Each use of the page is counted. Discarding may be accomplished by decrementing the reference or "use" count. When the count goes to zero, it means that the storage can be freed back for allocation. The failed portion of the commit process ends at step 680.

When the commit is successful, as determined at step 620, the zone map is updated by adding all zone descriptors from all add-tuple-sets at step 650. The zone map is further updated by removing all first zone descriptors and replacing them with all second zone descriptors at step 660. All first zone descriptors and first delete tuple identifier columns are freed for all zones in the delete-tuple-set at step 670. The successful portion of the commit process ends at step 680.

At some point in time, the database becomes in need of maintenance (e.g., similar to disk defragmentation). In other words, there may be storage segments in need of consolidation or garbage collection. The DBMS maintains metadata (e.g., garbage collection statistics) to know whether a given version of a tuple should be visible to a given transaction. In this regard, each user or process that initiates a transaction may be given a snapshot of the tuples affected by the transaction. That version of tuple may be identified by the TID or a timestamp. Accordingly, when a database technique such as MVCC is employed, the various transactions may see different versions of those tuples. Eventually, after plural transactions, some tuple may no longer be visible to any transaction and can be garbage collected.

To further illustrate, each executing transaction has a list of TIDs for other transactions whose effects the current transaction cannot "see" (i.e., concurrent transactions or transactions that have not been committed). That list of TIDs may be referred to as the "invisibility list" or conversely, other TIDs may be considered "visible." Specifically, the current transaction can test the ctid of a tuple against the invisibility list to learn if the tuple was created by a transaction on the invisibility list (i.e., prior to the current transaction, yet uncommitted) and that the current transaction should not process "invisible" tuples. For example, given the temporal nexus between monotonically incremented TIDs, those transactions with TIDs (e.g., ctids) on the invisibility list have not been committed, and therefore represent an "unknown" transaction state.

Similarly, the current transaction can test the TID (e.g., dtid) of a tuple to learn if the tuple was deleted by a transaction on the invisibility list and that the current transaction should process the tuple on the invisibility list as if it were "visible." For example, those transactions that delete tuples prior to the execution of the current transaction represent viable tuples for processing and tuples that may be used during the commit process. When tuples are no longer visible based on the invisibility lists, the tuple may be ignored by the current transaction or ultimately may be garbage collected.

Briefly, a deleted tuple might naturally be considered a garbage tuple. However, as described above, a deleted tuple is not a garbage tuple as it may still be visible to other transactions, and therefore, may need to be retained for backup and replication purposes. The decision of whether to perform garbage collection can be based on several criteria, including but not limited to, collection thresholds, percentages or other statistics based techniques (e.g., distribution parameters for Gaussian or Chi-square distributions, a t-test (for small samples), etc.). If a page of data has only a few deleted elements, it may not be worth rewriting the page of data to squeeze out the small amount of "free-able" space. If a page has many deleted elements, then it may be important for future performance to rewrite and consolidate data to avoid reading through and filtering out garbage tuples.

Figure 7:
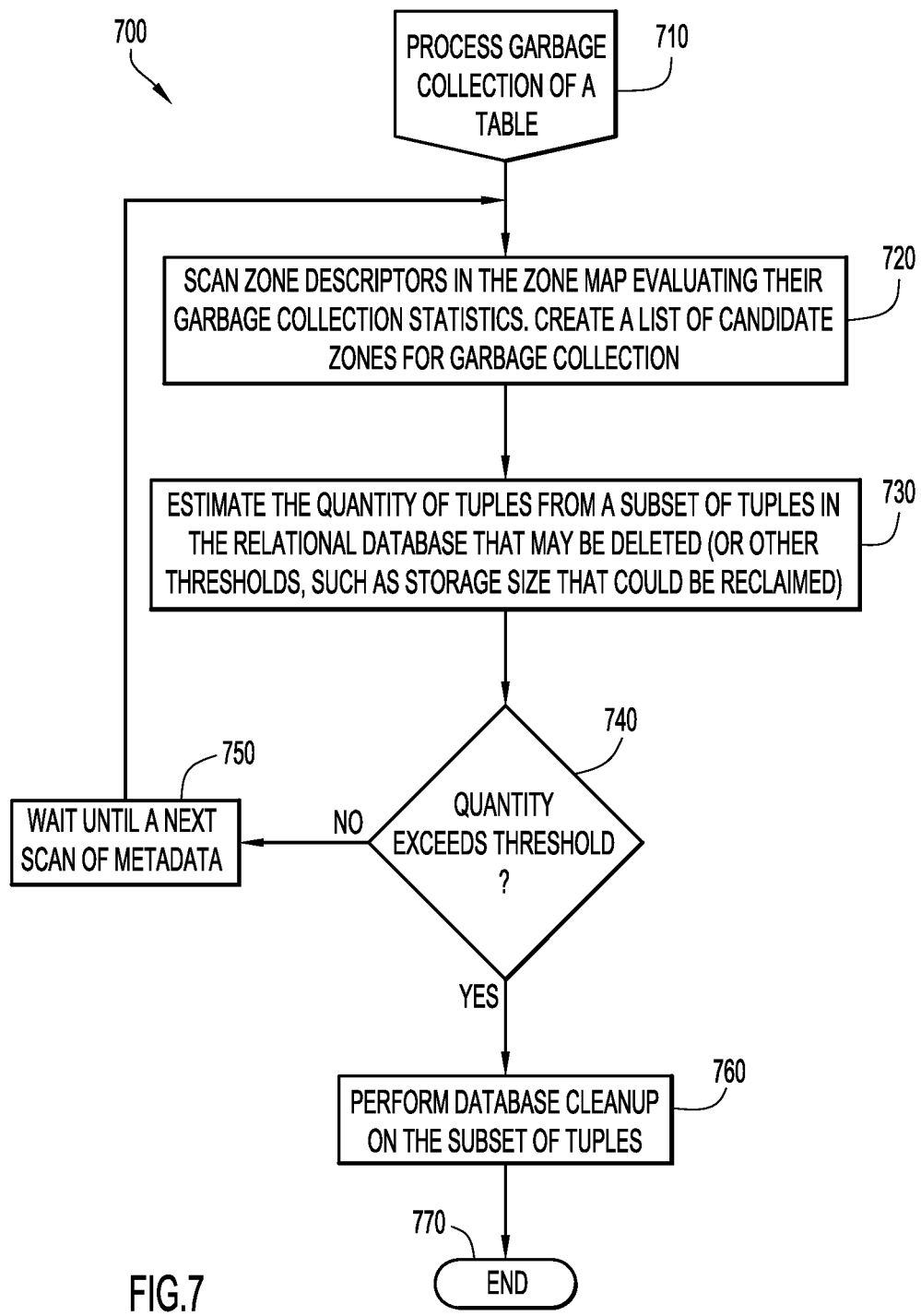
FIG. 7 is a procedural flow chart illustrating a manner which garbage collection operations are performed in a database according to an embodiment of the present invention.

A manner in which transaction module 16 and/or garbage removal module 20 processes or accesses data within a database object continues from FIG. 3 (step 375) to FIG. 7 as indicated by off-page connector at reference numeral 710. The zone descriptors in the zone map are scanned, their garbage collection statistics evaluated, and a list of candidate zones for garbage collection are created at step 720. The quantity of tuples from a subset of tuples (object portion) in the relational database that may be deleted is estimated (or by way of other estimation thresholds, such as storage size that could be reclaimed) at step 730.

As described above, it is efficient to identify a delete TID within a tuple set (e.g., a database page or other tuple grouping unit), such that a percentage (e.g., K percent (K %)) of deleted tuples in that set have older TIDs than the current TID. In other words, tuple age may be determined at least by timestamp or by the fact that TIDs are incremented sequentially. The TID that results in K % of deleted transactions is retained in the metadata about the given or respective tuple set. At a later time, the system can compare the oldest visible TID with the K % TID of the tuple set, and when the K % TID is as old or older than the oldest visible TID, the system knows that at least K % of the tuples in the tuple set are collectable garbage.

During delete processing, the value of one or more dtids are changed to mark those tuples as deleted by the executing transaction, and a new copy of the dtid column is created (e.g., dtid' as described above) that refers to the existing copies of all other columns. Whether the quantity of collectable garbage exceeds a threshold is determined at step 740. For garbage collection, the decision to collect garbage data may be made based on a given threshold for garbage collection (e.g., K %). As transactions are processed and dtid' columns are generated, the TID is determined for which K % of the deleted rows are as old as or older than the current TID (i.e., tuples with TID values < or <=the current TID value). If there is such a TID, the TID is recorded in the zone descriptor, e.g., as a collection TID. Garbage collection statistics and other information may be gathered as transactions progress and stored along with or within the metadata. If such a collection TID is not present for the currently processed transaction/zone, then those deleted tuples may have their TIDs left in the zone descriptor with a NULL or "not-enough-garbage" indicator or value.

Using the collection TID, the zone descriptors for a table can be scanned to determine a quantity of garbage data that may possibly be collected. That is, the current oldest visible TID can be compared to the collection TID in each zone descriptor. When the collection TID is as old as or older than the oldest visible TID, then at least K % of that zone is garbage data. Zones that meet the K % threshold may be referred to as candidates for collection or candidate zones. As described above, it is possible that a zone could have K % deleted rows/tuples, but not K % garbage rows/tuples.

According to the K % threshold technique, garbage is determined based on TID comparisons and cannot be determined during a given delete operation. In one example, the number of zones that have hit the garbage threshold are summed. A decision whether it is worth collecting any garbage data from the table may be based on the zone summation, which translates to garbage collection for a lager storage area such as a page of data for which a given table spans. The aggressiveness of garbage collection mechanism can be tuned based on the zone summation. Accordingly, and for ease of maintenance, when garbage is collected, it is only necessary to rewrite those zones that have at least K % garbage data. It should be noted these that techniques can be applied regardless of the physical layout of the data. In other words, and although described with respect to a column store, garbage collection can be used for data that is either columnar, or row-oriented or a hybrid data structure. That is, these garbage collection techniques rely on maintaining an oldest visible TID.

Other statistics may be kept in the metadata, e.g., the percentage of garbage data in the zone or the number of bytes in the zone that may be freed. These statistics may be summed or averaged and compared to an appropriate corresponding threshold. In another example, costs of keeping garbage data and costs of collecting garbage data may be maintained. These costs may be monitored and maintained over time. These costs may be processed according to a statistical distribution and statistical parameters may be generated. For example, with a Gaussian or normal "bell curve" distribution cost deviations and variances may be computed. Based on, for example, the cost of garbage and the cost of collection, standard deviations may be computed and the decision to garbage collect may be made using these statistics. In one example, the K % value may be adjusted based on total cost. This may be had by empirical, experimental, or statistical analysis such that K % is adjusted (e.g., to minimize the total cost function for a period of time (i.e., total cost=cost of maintaining garbage data+the cost of garbage collection)). The costs may be in terms of relative cost (e.g., the cost of garbage collection may be a negative value). In this example, it may be advantageous to perform garbage collection when the cost of keeping garbage data is equal to the cost of garbage collection, or a cost function is zeroed (cost=cost of maintaining garbage data−the cost of performing garbage collection=0).

To further illustrate, when there is no garbage data, the cost of collection is high relative to the cost of garbage data, which is zero since there is no garbage. Collecting zero garbage still has a cost because the metadata has to be scanned. As garbage data begins to accumulate, the cost of garbage data increases and the cost of garbage collection also increases (e.g., now that there is something to collect). However, the cost of garbage data may generally rise faster that the cost of collection. Thus, the costs can be analyzed to determine when a total cost exceeds a threshold or the cost of garbage data exceeds the cost of collection or a combination of both (i.e., cost of garbage data>cost of collection and total cost>X). Furthermore, sensitivity analysis may be employed (e.g., the standard deviation of garbage data cost may be much larger than the standard deviation of collection costs). Accordingly, weighted functions may be used to weight the cost deviations when performing cost analysis and threshold adjustment. Thus, as the database environment changes (e.g., grows), an adaptive model may be used to dynamically (or at batch processing time) adapt the thresholds described herein. In this regard, the quantity of garbage data in the database object or object portion may be converted to a cost value.

By way of an example cost model, performing a piece of garbage collection incurs a one-time cost in terms of CPU and I/O usage, while the cost of not performing the garbage collection incurs ongoing overhead in both storage and I/O costs for each operation that accesses the data. Thus, comparing the cost of not collecting garbage to the cost of collection garbage may not be a simple matter of arithmetic, but requires a cost model (e.g., a fixed or adaptive cost model). For example, it may be determined that 1 second of CPU is worth 1 MB of storage in perpetuity, and that 10 MB of I/O is worth 1 MB of I/O for each subsequent access to the data in question, given the anticipated frequency of data access and the lifetime of the data. The above example cost model is analogous to the cost model used for compressing data. For example, compressing data before writing it to storage has an immediate cost in CPU usage for performing the compression and an ongoing cost in CPU usage for decompression each time the data is used. These costs can be weighed against an immediate savings in I/O due to compression, ongoing savings in storage space, and I/O each time the compressed data are read.

If the quantity of garbage data does not exceed the threshold at step 740, then at step 750, the process waits until the next garbage collection scan is initiated. If the quantity of garbage data exceeds the threshold at step 740, then a database garbage collection is performed on the subset of tuples at step 760. The process ends at step 770 or may return to processing as shown in FIG. 3 where the process may end or continue for a next iteration.

It will be appreciated that the embodiments described above and illustrated in the drawings represent only a few of the many ways of implementing techniques to perform removal of garbage data from a database.

The environment of the present invention embodiments may include any number of computer or other processing systems (e.g., client or end-user systems, host systems, data servers, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, transaction module, garbage removal module, etc.). These systems may include any types of monitors and input devices (e.g., keyboard, mouse, voice recognition, etc.) to enter and/or view information.

It is to be understood that the software (e.g., transaction module, garbage removal module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client, data servers, and host systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., transaction module, garbage removal module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information (e.g., data, documents, zone indices/maps, etc.). The database system may be implemented by any number of any conventional or other databases, data stores or storage structures (e.g., files, databases, data structures or tables, data or other repositories, etc.) to store information (e.g., data, documents, zone indices/maps, etc.). The database system may be included within or coupled to the server and/or client systems. The database systems and/or storage structures may be remote from or local to the computer or other processing systems, and may store any desired data (e.g., data, documents, zone indices/maps, etc.).

The present invention embodiments may employ any number of any type of user interface (e.g., Graphical User Interface (GUI), command-line, prompt, etc.) for obtaining or providing information (e.g., databases, documents, indices, range maps, transaction information, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for performing database garbage collection associated with any type of database, memory or any other storage structure (e.g., data; data structures; row, column or hybrid stores, etc.). Database garbage collection may be initiated using any type or number of thresholds (e.g., percentages, costs, data quantities, etc.). The threshold may be determined base on any number of type of mechanisms (e.g., heuristically, empirically, deterministically, etc.) and may utilize type or quantity of deterministic techniques (e.g., statistics, cost analysis, sensitivity analysis, etc.). Any number or type of statistical distribution may be employed and may be based on the types of underlying data (e.g., Gaussian distribution, Chi-square distribution, Student's t-test, etc.). The thresholds may be stored in any convenient fashion (e.g., as a separate table, in metadata such as zone indices, zone maps, descriptors, ctids, dtids, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   storing, in a database, a database object in a form of a database table as a plurality of different object portions, wherein each object portion includes plural copies of data tuples of the database table and each copy of a data tuple of the database table includes a corresponding change to data of that data tuple of the database table, and wherein each copy of a data tuple of the database table is associated with a transaction identifier of a database transaction generating the corresponding change to data for that data tuple of the database table;
   determining, via a hardware processor, a transaction identifier for an oldest database transaction for which a corresponding copy of the data tuple of the database table remains visible;
   determining, via a hardware processor, a threshold amount of data to remove for each object portion stored in the database;
   identifying, via a hardware processor, a threshold transaction identifier for database transactions for each object portion such that a set of copies of the data tuples in that object portion have associated transaction identifiers older than the threshold transaction identifier, and wherein an amount of copies of the data tuples in the set corresponds to the threshold amount of data to remove;
   examining, via a hardware processor, each object portion and determining object portions with the threshold amount of data to remove by comparing the threshold transaction identifiers for database transactions of those object portions to the determined transaction identifier of the oldest database transaction; and
   removing, via a hardware processor, data from the database object in response to a sufficient quantity of the determined object portions containing the threshold amount of data to be removed based on the threshold transaction identifiers being at least as old as the determined transaction identifier of the oldest database transaction.

2. The method of claim 1, wherein examining each object portion includes:
   comparing the threshold transaction identifier of each object portion to the determined transaction identifier of the oldest database transaction to determine a quantity of object portions with the threshold amount of data to be removed.

3. The method of claim 1, wherein the threshold transaction identifier for each object portion represents a percentage of transaction identifiers within that object portion.

4. The method of claim 1, further comprising:
   determining a threshold statistic for measuring a quantity of data in the database object that is not visible and can be permanently deleted;
   processing a current transaction for a given object portion, wherein examining includes examining the given object portion during the processing of the current transaction;
   determining when a quantity of data in the given object portion that is not visible exceeds the threshold statistic; and
   recording information indicating whether or not that the given object portion contains the threshold amount of data.

5. The method of claim 4, wherein determining the threshold statistic comprises determining one or more of a heuristic threshold statistic, an empirical threshold statistic, and a deterministic threshold statistic.

6. The method of claim 1, further comprising:
   recording metadata indicating whether or not each object portion contains the threshold amount of data to be removed; and
   scanning the metadata to determine when the sufficient quantity of object portions contain the threshold amount of data to be removed.

7. The method of claim 1, wherein at least one transaction identifier identifies a delete transaction.

8. A system comprising:
   a database to store a database object in a form of a database table as a plurality of different object portions, wherein each object portion includes plural copies of data tuples of the database table and each copy of a data tuple of the database table includes a corresponding change to data of that data tuple of the database table, and wherein each copy of a data tuple of the database table is associated with a transaction identifier of a database transaction generating the corresponding change to data for that data tuple of the database table; and
   at least one hardware processor configured to:
     determine a transaction identifier for an oldest database transaction for which a corresponding copy of the data tuple of the database table remains visible;
     determine a threshold amount of data to remove for each object portion stored in the database;
     identify a threshold transaction identifier for database transactions for each object portion such that a set of copies of the data tuples in that object portion have associated transaction identifiers older than the threshold transaction identifier, and wherein an amount of copies of the data tuples in the set corresponds to the threshold amount of data to remove;
     examine each object portion and determine object portions with the threshold amount of data to remove by comparing the threshold transaction identifiers for database transactions of those object portions to the determined transaction identifier of the oldest database transaction; and remove data from the database object in response to a sufficient quantity of the determined object portions containing the threshold amount of data to be removed based on the threshold transaction identifiers being at least as old as the determined transaction identifier of the oldest database transaction.

9. The system of claim 8, wherein examining each object portion includes:

comparing the threshold transaction identifier of each object portion to the determined transaction identifier of the oldest database transaction to determine a quantity of object portions with the threshold amount of data to be removed.

10. The system of claim 8, wherein the threshold transaction identifier for each object portion represents a percentage of transaction identifiers within that object portion.

11. The system of claim 8, wherein the at least one hardware processor is further configured to:

determine a threshold statistic for measuring a quantity of data in the database object that is not visible and can be removed;

process a current transaction for a given object portion, wherein examining includes examining the given object portion during the processing of the current transaction;

determine when a quantity of data in the given object portion that is not visible exceeds the threshold statistic; and record information indicating whether or not that the given object portion contains the threshold amount of data.

12. The system of claim 11, wherein determining the threshold statistic comprises determining one or more of a heuristic threshold statistic, an empirical threshold statistic, and a deterministic threshold statistic.

13. The system of claim 8, wherein the at least one hardware processor is further configured to:

record metadata indicating whether or not each object portion contains the threshold amount of data to be removed; and scan the metadata to determine when the sufficient quantity of object portions contain the threshold amount of data to be removed.

14. A computer program product comprising:

a computer readable storage medium having computer readable program code embodied therewith and executable by at least one processor, wherein a database stores a database object in a form of a database table as a plurality of different object portions, wherein each object portion includes plural copies of data tuples of the database table and each copy of a data tuple of the database table includes a corresponding change to data of that data tuple of the database table, wherein each copy of a data tuple of the database table is associated with a transaction identifier of a database transaction generating the corresponding change to data for that data tuple of the database table, and wherein the computer readable program code is configured to cause the at least one processor to:

determine a transaction identifier for an oldest database transaction for which a corresponding copy of the data tuple of the database table remains visible;

determine a threshold amount of data to remove for each object portion stored in the database;

identify a threshold transaction identifier for database transactions for each object portion such that a set of copies of the data tuples in that object portion have associated transaction identifiers older than the threshold transaction identifier, and wherein an amount of copies of the data tuples in the set corresponds to the threshold amount of data to remove;

examine each object portion and determine object portions with the threshold amount of data to remove by comparing the threshold transaction identifiers for database transactions of those object portions to the determined transaction identifier of the oldest database transaction; and remove data from the database object in response to a sufficient quantity of the determined object portions containing the threshold amount of data to be removed based on the threshold transaction identifiers being at least as old as the determined transaction identifier of the oldest database transaction.

15. The computer program product of claim 14, wherein examining each object portion includes:

comparing the threshold transaction identifier of each object portion to the determined transaction identifier of the oldest database transaction to determine a quantity of object portions with the threshold amount of data to be removed.

16. The computer program product of claim 14, wherein the threshold transaction identifier for each object portion represents a percentage of transaction identifiers within the object portion.

17. The computer program product of claim 14, wherein the computer readable program code further causes the at least one processor to:

determine a threshold statistic for measuring a quantity of data in the database object that is not visible and can be removed;

process a current transaction for a given object portion, wherein examining includes examining the given object portion during the processing of the current transaction;

determine when a quantity of data in the given object portion that is not visible exceeds the threshold statistic; and record information indicating whether or not that the given object portion contains the threshold amount of data.

18. The computer program product of claim 17, wherein determining the threshold statistic comprises determining one or more of a heuristic threshold statistic, an empirical threshold statistic, and a deterministic threshold statistic.

19. The computer program product of claim 14, wherein the computer readable program code further causes the at least one processor to:

record metadata indicating whether or not each object portion contains the threshold amount of data to be removed; and scan the metadata to determine when the sufficient quantity of object portions contain the threshold amount of data to be removed.

* * * * *